3,104,207
MALTING OF BARLEY
Percy Wragg Brian and Margaret Edith Radley, Welwyn, England, assignors to Imperial Chemical Industries Limited, London, England, a corporation of Great Britain
No Drawing. Filed Apr. 7, 1960, Ser. No. 20,531
Claims priority, application Great Britain June 22, 1956
16 Claims. (Cl. 195—70)

This invention relates to improvements in the production of malt from barley and is a continuation-in-part of our application No. 666,241, filed June 17, 1957, now abandoned.

In the production of malt from barley the barley is moistened with water by steeping and is then spread out in a layer to germinate until the desired degree of modification of the corns has been attained. After about 7–10 days the germinated barley is dried by kilning to stop further germination and to remove surplus moisture. During germination, development or activation of enzyme systems for example amylases, takes place and this is important as far as subsequent commercial uses of the malt are concerned. Relatively low germination temperatures of about 55–65° F. are desirable in order to reduce losses from respiration and growth of rootlets and still bring about the desired physical and chemical changes. The normal loss in the dry substance of barley in malting varies with conditions but is frequently of the order of 8–10%. An increase in temperature or in growth time (both of which increase growth) results in an increased malting loss. One of the standard tests of the quality of a malt is the determination of amylase activity sometimes referred to as diastatic power and expressed in degrees Lintner, by a procedure such as that given in the Journal of the Institute of Brewing, 1933, volume 39, pages 517–525. Another important test from the user viewpoint, is the extract value, that is to say the water-soluble extract yielded by the malt, under standardised conditions.

It is known from the work of Hayashi, published in the "Journal of the Agricultural Chemical Society of Japan," 1940, 16, 531, that a product known as gibberellin stimulated the germination of barley, wheat and rice grains and also increased the amount of amylase in the germinated barley and wheat grains. This discovery however is only of academic interest and has no industrial or commercial application as is evidenced by the complete lack of interest in this publication throughout the world until the discovery of gibberellic acid and its functional derivatives. The Japanese discovery could not be applied to a large scale malting operation because the gibberellin was a crude mixture, the composition of which was unknown and successive preparations of it indicated that its composition was variable. As such, it could not be used in the malting of barley where accurate control of the operation is essential if undesirable losses are to be avoided. This feature of accurate control of operations in the malting of barley is important as will be seen from the description given later in this specification.

It is an object of the present invention to provide an improved process for the manufacture of malt from barley which includes the step of moistening the said barley with an aqueous solution or suspension of a gibberellic acid product prior to germination, as hereinafter defined.

It is a further object of the invention to provide an improved process for the manufacture of malt from barley which includes the step of moistening the said barley with an aqueous solution or suspension of gibberellic acid or an alkali metal salt thereof for example sodium or potassium gibberellate prior to germination.

It is to be understood that by the expression "prior to germination" we mean that period prior to the point in time when the soaked barley begins to "chit" or show the white tip of its rootlet. A standard work on brewing, entitled "Biochemistry of Brewing," by I. A. Preece (Oliver and Boyd 1954), states that "the exact point at which germination may be said to begin it would be pointless to enquire. For the practical man germination is known to have occurred at chitting, when the white point of the rootlet is beginning to emerge at the micropyle end."

The application of gibberellic acid or a functional derivative thereof should thus be made before "chitting" but the exact stage is a matter for local convenience and experience. It may be applied during the preliminary steeping stage and, if so preferably in the last soak water, or it may be applied after the steeping stage and when the barley has subsequently been spreaded out and before germination or "chitting" begins or again it may be applied partly during the steeping stage and partly after the steeping stage.

Further objects of this invention will become evident from the subsequent description and it will be obvious that many variations are possible in the appliction of this discovery to the malting of barley process but such variations do not depart from the original concept of this invention.

Gibberellic acid is an organic acid, only recently discovered and is the subject of U.S. Patent specification No. 2,842,051. It is to be understood that according to the present invention the expression "gibberellic acid product" includes besides gibberellic acid itself, functional derivatives of gibberellic acid, the said functional derivatives of gibberellic acid being salts of gibberellic acid having known plant growth promoting properties and being utilisable in the malting of barley process. Such functional derivatives may be the alkali metal salts for example the sodium and potassium salts, the alkaline earth metal salts for example the calcium salt and the ammonium salt. At the dilutions used in the process of the present invention, salts of gibberellic acid are completely dissociated and the activity of such salts is the effect produced by the gibberellate anion in a biological medium.

The invention is illustrated in its simplest form but is in no way intended to be limited by the description of the following two experiments:

Samples of barley, variety 1953/54 Plumage Archer, were soaked for two days in aqueous solutions of gibberellic acid and control samples were likewise soaked in distilled water. For the first experiment 600 gm. samples of barley were soaked in one litre of solution. For the second experiment 300 gm. samples of barley were soaked in 500 ml. of solution (see details below). The samples were then spread out on absorbent paper in porcelain dishes and covered with more absorbent paper. This was then moistened with the solution the barley had been soaked in. The depth of the layer of barley was about 1 cm. The barley was allowed to germinate for a varying number of days. Both soaking and germination took place in an incubator at about 15° C.

The sprouted barley was dried in a current of air heated to about 70° C. for 8 hours. It was subsequently ground in a mill, and was kept in a refrigerator until used.

The method of testing for diastatic activity which was used was that given in the Institute of Brewing Standard Methods of Analysis (1933).

25 gm. of each sample were extracted with 500 ml. of distilled water for 3 hours at 21° C., stirring well every half-hour. Finally the grains were allowed to settle and the supernatant liquid was used for the test. In the second experiment 10 ml. of this were removed and diluted with distilled water.

A range of volumes of the supernatant liquid was added to a series of test tubes each containing 10 ml. of a 2% solution of soluble starch buffered at pH 4.6. The tubes were shaken and allowed to stand in a water-bath at a temperature of 21° C. for hour. At the end of this time 5 ml. of Fehling's solution were added to each tube, the tubes were again shaken and the series was placed in a boiling water bath for 10 minutes. The precipitate was then allowed to settle and the degree of reduction of the Fehling's solution noted by its colour. The solution was colourless if the exact degree of reduction was found, otherwise the end-point lay between two consecutive tubes, one blue and one yellow.

The diastatic activity was calculated in degrees Lintner by dividing the volume of extract required for complete reduction into 10. In the second experiment the volume before dilution was used in the calculation.

RESULTS

First Experiment

One 600 gm. sample of the barley was soaked in distilled water and another 600 gm. sample of the barley was soaked in an aqueous solution containing 5 $\mu$g./ml. (5 mg./litre) gibberellic acid. A quarter of each sample was taken after 3, 5, 7 and 10 days. The results were as follows:

| Number of days germinating | Diastatic activity (degrees Lintner) | |
| --- | --- | --- |
| | Control | Treated |
| 3 | 26 | 40 |
| 5 | 67 | 91 |
| 7 | 100 | 111 |
| 10 [1] | 111 | 100 |

[1] A preliminary experiment had suggested that the treated barley was more active than the controls at 10 days.

The above experiment illustrates the use of 8.3 parts of gibberellic acid per $1 \times 10^6$ parts by weight of barley taken as starting material.

Second Experiment

Four 300 gm. samples of the barley were soaked in distilled water containing 1 $\mu$g./ml., 5 $\mu$g./ml., 25 $\mu$g./ml. (i.e. 1, 5 and 25 mg./litre respectively) gibberellic acid and no gibberellic acid. A half of each sample was taken at 3 days and a half at 6 days. The results were as follows:

| Concentration of gibberellic acid | Diastatic activity (degrees Lintner) | |
| --- | --- | --- |
| | 3 days | 6 days |
| Control (no gibberellic acid) [1] | <25 | <50 |
| 1 $\mu$g./ml. | 29 | 91 |
| 5 $\mu$g./ml. | 40 | 91 |
| 25 $\mu$g./ml. | 45 | 83 |

[1] An end-point was not obtained for the control sample.

These experiments show that the rate of development of amylase activity in the malting of barley is accelerated by treatment of the barley with gibberellic acid.

The above experiments illustrate the use of 1.65, 8.3 and 41.5 parts respectively of gibberellic acid per $1 \times 10^6$ parts by weight of barley taken as starting material.

It is known that the malting of barley is a highly skilled operation and the process of soaking, spreading out in a layer to germinate and arrest of growth by kilning of the barley must be carefully controlled in order to obtain the desired product in a satisfactory state and in good yield. It will be realized that any attempt to alter the rate of germination of barley in the production of malt must be carefully controlled otherwise the biological process involved can get out of hand and lead to poor quality in the desired product. The dosage rate of gibberellic acid, or a functional derivative thereof, and the period and the temperature of germination must be carefully controlled in order that the malting process can be stopped at the optimum point. Hence, accurate control of dosage is necessary and the compound used, gibberellic acid or a functional derivative thereof as defined above is ideally suited for this purpose and gives good, reproducible results. A crude gibberellin of variable composition and thus variable biologically-active material could not be used on a large technical and commercial scale because the applied amount of active material would not be accurately controlled and the process would be unmanageable. In contrast, the use of gibberellic acid or a functional derivative thereof instead of a crude gibberellin preparation in the malting of barley is advantageous technically and commercially because (i) the amount of biologically active material used is accurately controlled, (ii) the malting process is easily manageable, (iii) yields of malt are increased, (iv) the process is reliable and accurately reproducible, and (v) the process can be carried out on a large scale.

It is to be understood that even when gibberellic acid or a functional derivative thereof is used in the malting of barley, it is important to use a specified amount of the said gibberellic acid within a restricted range of concentration based upon the amount of barley to be treated. Outside the lower limit of this range, the advantage obtained is negligible and outside the upper limit of this range, operation of the process is economically unsound and the excess of gibberellic acid leads to undesirable effects. The useful range of concentration in the malting of barley is from 0.25 part to 5.0 parts of gibberellic acid, or a functional derative thereof, per $1 \times 10^6$ parts by weight of barley used as starting material, i.e. 0.25–5.0 parts per million or p.p.m. of barley. The preferred range of concentration is 0.25 to 3 p.p.m. of the said gibberellic acid or functional derivative. The amount of gibberellic acid used in any particular malting operation will depend upon several factors including the type and condition of barley used as starting material, the kind of process being operated i.e. whether the barley is on floors or in boxes, compartments, drums or other containers, and the frequency of stirring or turning, the method of moistening the barley, i.e. by steeping or moistening in one or more operations, the ability to manage the process and prevent sudden rapid rises in temperature of the germinating barley, the need to control accurately the germination period so that increased malt extract is accompanied by a decrease or little or no increase in malting loss and the particular use to which the final malt extract will be placed.

The gibberellic acid may be added to the barley most conveniently by moistening the barley with an aqueous solution or suspension of the gibberellic acid or functional derivative thereof before germination, i.e. during the soaking or steeping period prior to flooring or after the steeping period and during the flooring period prior to germination, i.e. before "chitting" takes place. It is to be understood however that the requisite amount of said acid or derivative thereof may be added all at once or portionwise or continuously as the malting operation proceeds, depending upon the economics of the techniques adopted which are known to vary widely from one malting plant to another and also from country to country.

The said acid may be added portionwise as the barley is steeped and aerated prior to laying on the floor or in a compartment. It is preferably added during the final steeping period. It may be added partly during the steeping period and partly during the flooring period prior to germination. Alternatively the said acid may be added after steeping and when the barley is on the floor or in a compartment prior to germination. The said acid may be added in the solid form or in the form of an aqueous solution or suspension and it may be applied by sprinkling or spraying according to established malting procedures. It will be understood that the particular method of addition adopted will be dependent upon the technique of the malster, the operating plant available and the ease of incorporating this additional step or steps into the established routine of the malting process. The method used however is relatively unimportant as will be appreciated since the essential requisite of this invention is to have the gibberellic acid product in contact with the barley prior to germination.

Gibberellic acid and its functional derivatives for example alkali metal salts thereof for example the sodium and potassium salt have been used in the malting of barley on a large scale according to established techniques and the results so obtained show that such use leads to increases in the yield of extract, and in diastase values. These beneficial results can be obtained together with a decrease or little or no increase in the usual malting loss because it is found that the period of germination before kilning can be reduced. Thus savings can be made on the flooring time or germinating time thereby allowing a quicker turnover of material. From a large number of trials in malting establishments the following selection of results indicates the advantages which are obtainable:

| Conc. of gibberellic acid (p.p.m.) | Period of germination (days) | Diastase value | | Dry extract (lbs.) | |
|---|---|---|---|---|---|
| | | Control | Treated | Control | Treated |
| 0.25 | 4 | 66 | 73 | 86.4 | 92.4 |
| | 6 | 81 | 100 | 96.2 | 96.3 |
| | 8 | 61 | 51 | 96.8 | 97.5 |
| 0.25 | 4 | 54 | 64 | 94.3 | 97.0 |
| | 7 | 70 | 66 | 100.0 | 100.8 |
| | 8 | 59 | 59 | 101.3 | 101.8 |
| 0.33 | 3 | 27 | 49 | 54.7 | 80.7 |
| | 5 | 82 | 90 | 86.0 | 97.8 |
| | 8 | 64 | 71 | 96.4 | 98.1 |
| 0.5 | 4 | 66 | 66 | 86.4 | 92.1 |
| | 6 | 81 | 90 | 96.2 | 98.0 |
| | 8 | 61 | 55 | 96.8 | 98.6 |
| 0.5 | 4 | 54 | 62 | 94.3 | 97.8 |
| | 7 | 70 | 68 | 100.0 | 100.4 |
| | 8 | 59 | 59 | 101.3 | 101.7 |
| 0.5 | 5 | 66 | 76 | 95.6 | 98.5 |
| | 8 | 71 | 82 | 99.9 | 101.0 |
| | 10 | 60 | 66 | 101.9 | 102.9 |
| 0.67 | 3 | 27 | 56 | 54.7 | 81.9 |
| | 5 | 82 | 94 | 86.0 | 99.9 |
| | 8 | 64 | 76 | 96.4 | 98.4 |
| 1.0 | 4 | 66 | 82 | 86.4 | 97.1 |
| | 6 | 81 | 111 | 96.2 | 98.9 |
| | 8 | 61 | 63 | 96.8 | 99.5 |
| 1.0 | 3 | 33 | 51 | 64.3 | 81.2 |
| | 4 | 57 | 60 | 89.2 | 94.3 |
| | 5 | 59 | 60 | 93.4 | 95.2 |
| | 6 | 58 | 70 | 96.4 | 98.9 |
| | 7 | 60 | 60 | 98.4 | 100.4 |
| | 9 | 60 | 64 | 99.2 | 100.1 |
| 1.0 | 3 | ---- | 55 | ---- | 91.4 |
| | 4 | 54 | ---- | 94.3 | ---- |
| | 6 | ---- | 76 | ---- | 101.2 |
| | 7 | 70 | 68 | 100.0 | 103.3 |
| | 8 | 59 | ---- | 101.3 | ---- |
| 1.0 | 4 | ---- | 64 | ---- | 93.9 |
| | 5 | 66 | ---- | 95.6 | ---- |
| | 7 | ---- | 82 | ---- | 101.1 |
| | 8 | 71 | ---- | 99.9 | ---- |
| | 9 | ---- | 69 | ---- | 103.2 |
| | 10 | 60 | ---- | 101.9 | ---- |
| 2.0 | 3 | 33 | 46 | 64.3 | 72.3 |
| | 4 | 57 | 60 | 89.2 | 93.9 |
| | 5 | 59 | 63 | 93.4 | 96.3 |
| | 6 | 58 | 70 | 96.4 | 100.3 |
| | 7 | 60 | 63 | 98.4 | 100.4 |
| | 9 | 60 | 76 | 99.2 | 101.3 |
| 2.0 | 3 | ---- | 57 | ---- | 85.9 |
| | 5 | 66 | ---- | 95.6 | ---- |
| | 6 | ---- | 86 | ---- | 101.8 |
| | 8 | 71 | 71 | 99.9 | 103.3 |
| | 10 | 60 | ---- | 101.9 | ---- |
| 2.0 | 8 | 94 | 96 | 101.1 | 102.6 |
| 2.0 | 8 | 84 | 85 | 99.5 | 101.5 |
| 3.0 | 3 | 33 | 53 | 64.3 | 80.5 |
| | 4 | 57 | 63 | 89.2 | 97.2 |
| | 5 | 59 | 74 | 93.4 | 99.1 |
| | 5 | 58 | 72 | 96.4 | 101.9 |
| | 7 | 60 | 72 | 98.4 | 101.8 |
| | 9 | 60 | 76 | 99.2 | 101.0 |
| 5.0 | 8 | 91 | 104 | 94.2 | 100.8 |
| 5.0 | 8 | 83 | 100 | 96.1 | 100.2 |
| 5.0 | 8 | 87 | 96 | 95.5 | 101.3 |

It will be seen that over the range of 0.25 to 5.0 p.p.m. of gibberellic acid or functional derivative thereof there is an increase in dry extract and an increase in diastase value over and above those values normally obtained in the conventional malting process. A further advantage of this proces is that, in certain circumstances, it may permit the use of a lower grade of barley which would normally not be suitable for use in the malting process. Thus certain varieties of barley which have been affected by the climatic conditions in a particular year may not be suitable for malting in the normal manner because of their low extract value but when used in a malting operation which includes the addition of gibberellic acid or a functional derivative thereof, the extract value of such barley is increased and the process becomes an economic commercial proposition.

These results indicate that appreciable advantages can be obtained by using a gibberellic acid product in the malting of barley. It has been found that unless considerable care and judgment are exercised, malting losses may become disproportionately high and it is obvious that the concentration of the gibberellic acid product used must be accurately controlled in order to achieve advantageous results in operating the process of the present invention.

What we claim is:

1. An improved process for the manufacture of malt from barley which includes the step of moistening the said barley with an aqueous gibberellic acid product selected from the group consisting of gibberellic acid and salts thereof, prior to germination wherein there is used from 0.25 part to 5.0 parts of the gibberellic acid product per $1 \times 10^6$ parts by weight of the said barley used as starting material.

2. Process as claimed in claim 1 wherein the gibberellic acid product is gibberellic acid.

3. Process as claimed in claim 1 wherein the gibberellic acid product is added during the steeping stage.

4. Process as claimed in claim 3 wherein the gibberellic acid product is added during the last soak water of the steeping stage.

5. Process as claimed in claim 1 wherein the gibberellic acid product is added after the steeping stage but before germination begins.

6. Process as claimed in claim 1 wherein the gibberellic acid product is partly during the steeping stage and partly after the steeping stage.

7. Process as claimed in claim 1 wherein the requisite amount of the gibberellic acid product is added all at once.

8. Process as claimed in claim 1 wherein the requisite amount of the gibberellic acid product is added portionwise.

9. Process as claimed in claim 1 wherein there is used from 0.25 part to 3.0 parts of the gibberellic acid product per $1 \times 10^6$ parts by weight of said barley used as starting material.

10. Process as claimed in claim 1 wherein the gibberellic acid product is an alkali metal salt.

11. Process as claimed in claim 1 wherein the gibberellic acid product is an alkaline earth metal salt.

12. Process as claimed in claim 1 wherein the gibberellic acid product is an ammonium salt.

13. Process as claimed in claim 1 wherein the gibberellic acid product is a sodium salt.

14. Process as claimed in claim 1 wherein the gibberellic acid product is a potassium salt.

15. Process as claimed in claim 1 wherein the gibberellic acid product is a calcium salt.

16. Process as claimed in claim 1 wherein the requisite amount of gibberellic acid product is added continuously.

References Cited in the file of this patent

UNITED STATES PATENTS

| | | |
|---|---|---|
| 2,522,409 | Stoller | Sept. 12, 1950 |
| 2,842,051 | Brian et al. | July 8, 1958 |

OTHER REFERENCES

"Breaking Dormancy in Barley by Gibberellic Acid and Rindite," by Fischnick et al., Naturwissenschaft, 1957, vol. 44, pages 531–538, C.A., 1958, vol. 52, page 7441.

Science, vol. 129, 1959, pages 807–816.

Hayashi, "J. Agr. Chem. Soc. Japan," vol. 16 (1940), pp. 531 to 538, abstracted on page 772 of vol. 35, Chem. Abstracts.